United States Patent [19]
Broll et al.

[11] 3,888,688
[45] June 10, 1975

[54] INORGANIC PIGMENTS AND PROCESS FOR THEIR PRODUCTION

[75] Inventors: Arno Broll, Rothenbergen; Herbert Mann, Dornigheim, both of Germany

[73] Assignee: Deutsche Gold-und Silber-Scheideanstalt vormals Roessler, Germany

[22] Filed: Apr. 30, 1974

[21] Appl. No.: 465,560

[30] Foreign Application Priority Data
May 10, 1973 Germany.............................. 2323481

[52] U.S. Cl. ......... 106/308 B; 106/288 B; 106/301; 106/292
[51] Int. Cl............................................ C08h 17/04
[58] Field of Search ............ 106/288 B, 308 B, 292, 106/301

[56] References Cited
UNITED STATES PATENTS

| | | | |
|---|---|---|---|
| 3,598,643 | 8/1971 | Hodes et al. .......................... | 106/301 |
| 3,802,900 | 4/1974 | Broll et al. ............................ | 106/301 |

*Primary Examiner*—Winston A. Douglas
*Assistant Examiner*—J. V. Howard
*Attorney, Agent, or Firm*—Cushman, Darby & Cushman

[57] ABSTRACT

Inorganic pigments are prepared containing a cadmium, zinc, mercury and/or manganese colored sulfides, sulfoselenide or selenide inclosed in crystalline silicon dioxide as discrete particles. The pigments are used to color synthetic resins and lacquers, varnishes or enamels.

12 Claims, No Drawings

INORGANIC PIGMENTS AND PROCESS FOR THEIR PRODUCTION

The invention is directed to inorganic yellow and red pigments useful in synthetic resins, e.g., melamine-formaldehyde resins, urea-formaldehyde resins, phenol-formaldehyde resins, polyethylene, polypropylene, ethylene-propylene copolymers, polyvinyl chloride, polystyrene, polymethyl methacrylate, nylon, etc. or lacquers, varnishes or enamels, etc. which are made of crystalline silicon dioxide in which there are built in (enclosed) the sulfide, sulfoselenide and/or selenide of a metal of the group of mercury, zinc, cadmium and/or manganese in the form of discrete particles.

There are used inorganic pigments to color synthetic resins because such pigments have high resistance to light, weather and chemicals. Above all, there are used in commerce as especially resistant pigments oxidic compounds such as, for example, Thenards blue ($CoAl_2O_4$), titanium green [$(Ni,Co)_2TiO_4$] and titanium yellow (mixed crystals of $TiO_2$ and $NiSbO_4$). Besides, there are also used sulfides such as CdS and HgS or sulfoselenides such as Cd(S,Se) as pigments because of their extraordinary brilliance.

Especially the cadmium sulfoselenides have considerable commercial importance because of the infinitely variable color tones from yellow to dark red. Disadvantages of these known pigments based on sulfur and selenium which are impossible to control are that they do not have unlimited resistance to acids and they have a definite sensitivity to oxidation with air oxygen as well as the possibility of a separation of Cd in contact with non-noble metals.

There are described in German applications Nos. 2312535 and 2315611 and Broll et al. U.S. application Ser. No. 356,166, filed May 1, 1973 and Broll et al. U.S. application Ser. No. 356,167, filed May 1, 1973 that glaze stable pigments are formed by the inclusion of cadmium sulfoselenide in $ZrSiO_4$ and $SnO_2$. These pigments, however, are unsuited for use in synthetic resins or lacquers or the like because first they are much too coarse and second they do not have brilliant, intensive colors which are comparable with pure (Cd(S,Se). The entire disclosure of the two Broll et al. United States applications are hereby incorporated by reference.

The glaze stable enclosing or encasing materials are responsible for these negative properties. The enclosing materials because of the high reaction temperatures become too coarse and their high refractive index is accompanied by a white portion in the coloring of synthetic resins. A pigment suitable for coloring synthetic resins must be especially finely divided. Besides the encasing material must not be visible after the pigmenting is completed.

Therefore, it was the problem of the present invention to produce a pigment that is suitable for coloring synthetic resins, e.g., any of those mentioned above, lacquers, varnishes and enamels and similar materials and which is especially resistant to chemicals and other external influences.

It has now been found according to the invention that inorganic pigments which contain colored sulfides and/or sulfoselenides and/or selenides of the metals cadmium, zinc, mercury and/or manganese as discrete particles built into crystalline modifications of silicon dioxide, as for example, $\alpha$-quartz or cristobalite or tridymite outstandingly fulfill these requirements.

Examples of such metal compounds include CdS, CdSe, Cd(S,Se), (Cd,Hg)S, (Zn,Cd)S and (Cd,Mn)S. Mixtures of such sulfides, selenides and sulfoselenides can also be used.

For the production of these pigments of the invention there has been found especially suitable a process in which a homogeneous solution of a colored compound to be encased and the encasing colorless compound are precipitated simultaneously whereby an especially intimate mixture of both components is formed. In this precipitation process there are formed amorphous compounds and the amorphous $SiO_2$ must be converted into crystalline silica at temperatures above 400°C. To prevent excessive growth of the sulfide, selenide or sulfoselenide inclusions, the amorphous precipitated silica is advantageously changed into a crystalline modification by calcination at temperatures of above 400°C. but below 1000°C. whereby the pores of the $SiO_2$ close and the sulfide, selenide or sulfoselenide are enclosed. In a given case it has been found advantageous to add fluoride mineralizers such as $NH_4F$, LiF, or LiBr in an amount of 0.5–5%.

There are formed in this manner for example pigments which have the color and brilliance of pure Cd(S,Se) pigment, however, embedded in crystalline silica. These pigments of the invention act toward chemicals, high temperatures and corrosive gases just like quartz.

In the production of pigment according to the invention naturally there is also formed Cd(S,Se) or the like which is not encased in $SiO_2$. These can be removed conveniently by treatment with concentrated $HNO_3$. Less preferably they can be removed by treatment with any other acid that dissolves the metal sulfide, selenide or sulfoselenide.

The sulfoselenide particles (or sulfide or selenide particles) embedded or encased in the silica naturally cannot react with the acid and give the pigment the desired color. A pigment thus produced according to the invention for example contains 1 to 30% Cd as Cd(S,Se) and is rose in powder form. However, if it is brought into a medium, as for example polyethylene, polystyrene, polyvinyl chloride or polymethyl methacrylate whose refractive index is not substantially different from quartz the quartz jacket is no longer seen and the pure, shining red of Cd(S,Se) prevails. Under the microscope there are clearly detected colorless quartz crystals with a large number of sulfoselenide inclusions. However, there are also found homogeneously colored crystals which apparently contain inclusions of submicroscopic size.

The size of the enclosed colored particles of sulfides, selenides and/or sulfoselenides generally is between 0.01 and 1 m$\mu$. The size of the pigment (i.e., the silica and enclosed particles) is 0.1 to 5 m$\mu$.

Unless otherwise indicated all parts and percentages are by weight.

The following examples further explain the pigments and their method of production according to the invention.

EXAMPLE 1

758 grams of water glass (26% $SiO_2$, 8% $Na_2O$, balance water), 50 grams of $Na_2S \cdot 9H_2O$ and 7 grams of Se were dissolved in 2 liters of water. 89 grams of $CdSO_4 \cdot 8/3 H_2O$ and 100 grams of $H_2SO_4$ were dissolved in 2.5 liters of water. Both solutions were pumped into a reaction vessel and strongly mixed together. The voluminous precipitate was filtered off, washed free of salt and dried at 150°C. The red-brown crude product was finely ground and treated with 3% $NH_4F$. A shining red pigment was formed by heating for 20 minutes to 650°C., which pigment was freed of non-enclosed Cd(S,Se) by boiling with concentrated $HNO_3$. Filtering and drying led to the end product which could be still further ground if required. The thus obtained rose pigment at 10% pigmentation for example colored polyvinyl chloride shining red.

EXAMPLE 2

An intensive red pigment was formed at a ratio of $SiO_2$:Cd(S,Se) of 2:1.5 in the precipitate. For this purpose 758 grams of the same water glass used in Example 1, 177 grams of $Na_2S \cdot 9H_2O$ and 21 grams of selenium were dissolved in 2 liters of water and reacted with a solution of 100 grams of $H_2SO_4$ and 267 grams of $CdSO_4 \cdot 8/3 H_2O$ in 2.5 liters of water. The precipitate was filtered and worked up as described in Example 1. After the $HNO_3$ treatment the shining red pigment still contained 25% Cd(S,Se).

EXAMPLE 3

758 grams of water glass (26% $SiO_2$, 8% $Na_2O$, balance water) and 83 grams of $Na_2S \cdot 9H_2O$ were dissolved in two liters of water and brought to reaction with a solution of 100 grams of $H_2SO_4$ and 89 grams of $CdSO_4 \cdot 8/3 H_2O$ in 2.5 liters of water in the manner described in Example 1. The further working up was in a manner analogous to Example 1 to produce a yellow pigment useful with synthetic resins such as those mentioned above, for example.

EXAMPLE 4

758 grams of water glass (26% $SiO_2$, 8% $Na_2O$, balance water) and 94 grams of $Na_2S \cdot 9H_2O$ were dissolved in 2 liters of water and brought to reaction with a solution of 100 grams of $H_2SO_4$, 90 grams of $CdSO_4 \cdot 8/3 H_2O$ and 13 grams of $HgSO_4$ in 2.5 liters of water. Using a process analogous to that in Example 1 there was obtained an orange colored pigment.

EXAMPLE 5

Likewise there was obtained an orange pigment when 758 grams of the water glass described in Example 1 and 83 grams of $Na_2S \cdot 9H_2O$ dissolved in 2 liters of water were mixed with a solution of 100 grams of $CdSO_4 \cdot 8/3 H_2O$ and 6 grams of $MnSO_4 \cdot H_2O$ in 2.5 liters of water to precipitate (Mn,Cd) sulfide and $SiO_2$. The precipitate was filtered and worked up as described in Example 1.

EXAMPLE 6

By annealing (90 minutes at 950°C.) 2,600 grams of finely divided silica, 530 grams of CdO, 605 grams of $Na_2SO_3$, 130 grams of LiF and 40 grams of sucrose which was pasted and homogenized with 1 liter of water there was formed a yellow pigment which after an $HNO_3$ treatment only still contained in the quartz enclosed CdS.

As is recognized in the art, sulfur and selenium are chalcogens of atomic weight 32 and 79 and hence the compounds encased are metal chalcogenides.

When the silica is formed by precipitation it is normally precipitating from a solution of aqueous alkali metal silicate. Similarly the starting aqueous chalcogenide is normally an alkali metal chalcogenide, e.g., sodium sulfide, sodium selenide, or a mixture thereof. The starting water soluble cadmium, zinc, mercury and/or manganese salt is normally the sulfate.

What is claimed is:

1. An inorganic pigment having discrete particles of a colored chalcogenide of (1) cadmium, (2) zinc, (3) mercury or (4) of manganese, said particles being encased in a crystalline form of silicon dioxide, and where the chalcogen has an atomic weight of 32 and 79.

2. An inorganic pigment according to claim 1 where the silicon dioxide is quartz or cristobalite.

3. An inorganic pigment according to claim 1 wherein the particles of the chalcogenide have a size between 0.01 and 1 m$\mu$.

4. An inorganic pigment according to claim 1 wherein the chalcogenide is a mixed chalcogenide of cadmium and manganese, mercury or zinc.

5. An inorganic pigment according to claim 1 wherein the chalcogenide is a cadmium chalcogenide.

6. An inorganic pigment according to claim 5 wherein the chalcogenide is CdS.

7. An inorganic pigment according to claim 5 wherein the chalcogenide is cadmium sulfoselenide.

8. A process for the production of an organic pigment according to claim 1 comprising simultaneously precipitating amorphous silica and the colored chalcogenide by mixing an aqueous solution of a water soluble silicate and a homogeneous solution of a water soluble salt of the chalcogen with a water soluble salt of cadmium, zinc, mercury or manganese to form particles of colored chalcogenide encased in amorphous silica, calcining the precipitate at a temperature between 400° and 1000° C. to change the amorphous silica to crystalline silica and treating the calcined material with an acid that dissolves excess chalcogenide not encased in the silica.

9. A process according to claim 8 wherein the water soluble silicate is an alkali metal silicate, the water soluble salt of the chalcogen is an alkali metal chalcogenide.

10. A process according to claim 9 wherein the alkali metal silicate is sodium silicate, the alkali metal chalcogenide is sodium chalcogenide and the water soluble cadmium, zinc, mercury or manganese salt is a sulfate.

11. A process according to claim 8 wherein the acid is nitric acid.

12. A process according to claim 8 wherein there is added a fluoride mineralizer subsequent to the precipitation.

* * * * *